United States Patent [19]

Gang et al.

[11] Patent Number: 4,639,921
[45] Date of Patent: Jan. 27, 1987

[54] METHOD AND AN APPARATUS FOR EARLY BIT COLLISION DETECTION

[75] Inventors: Joseph M. Gang, San Jose; Mitchell B. Bain, Mountain View, both of Calif.

[73] Assignee: Sytek, Inc., Mountain View, Calif.

[21] Appl. No.: 690,114

[22] Filed: Jan. 9, 1985

[51] Int. Cl.[4] .............................. G06F 11/10
[52] U.S. Cl. ....................... 371/53; 364/900
[58] Field of Search .............. 371/53, 54, 67, 68, 371/62; 364/200, 900

[56] References Cited

U.S. PATENT DOCUMENTS 3,675,202 7/1972 Verhoeff ........................ 371/53
3,686,629 8/1972 Yu ................................. 371/53
4,142,243 2/1979 Bishop ........................... 371/53
4,368,534 1/1983 Sibley ............................ 371/53

Primary Examiner—Michael R. Fleming
Attorney, Agent, or Firm—Thomas E. Schatzel

[57] ABSTRACT

Disclosed is a unit for interfacing an 82586-type local-communications controller to a modem of the type used in an RF network, the unit employing both an NRZI-to-NRZ converter which includes an algorithmic-state machine for converting packets encoded in NRZI format to NRZ format and for recovering the clocking information and a comparator for comparing successive check-sum portions derived from a packet for transmission in the network with similar portions derived from an echo packet received from the network to detect a packet collision.

5 Claims, 5 Drawing Figures

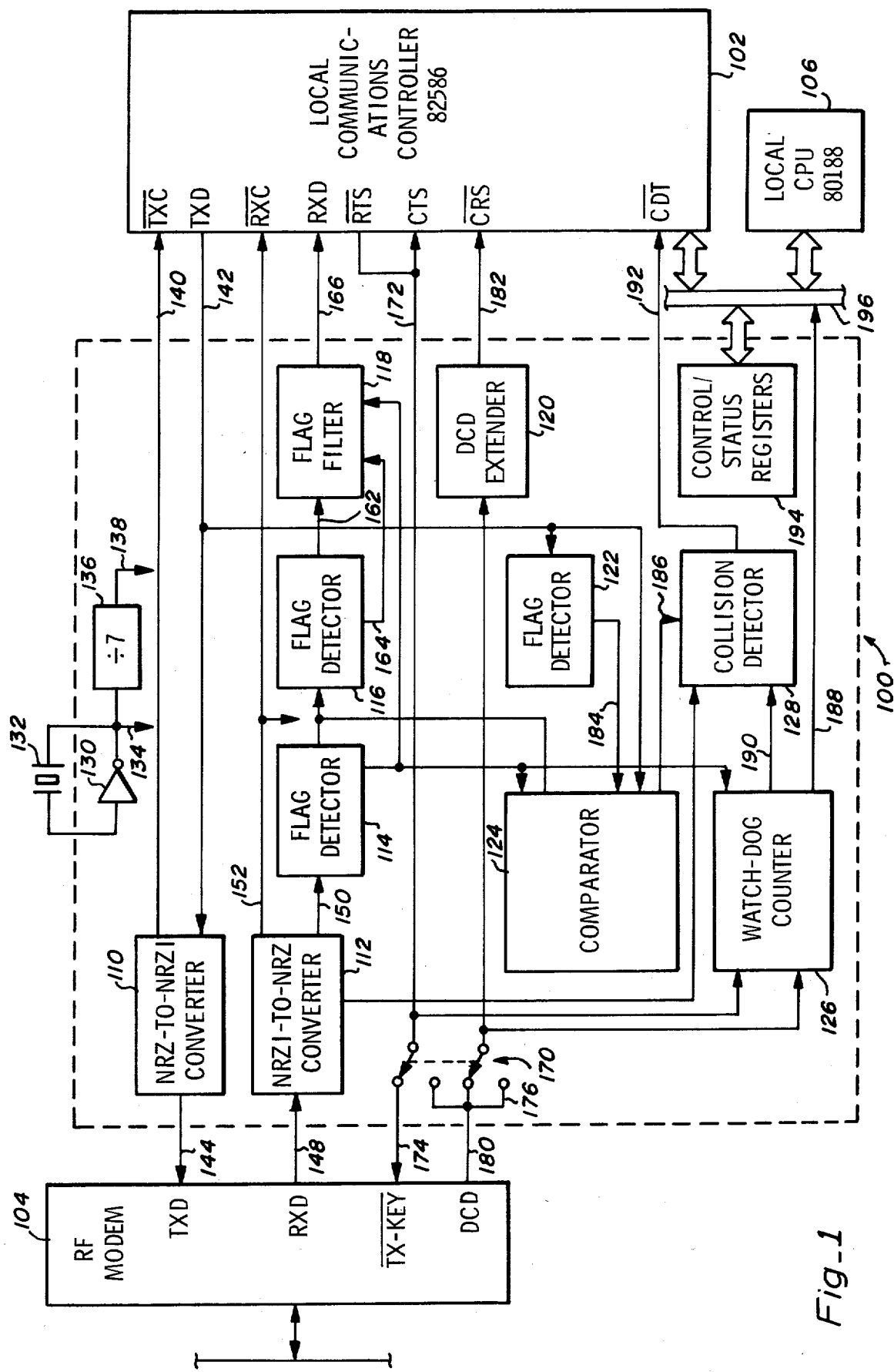
Fig_1

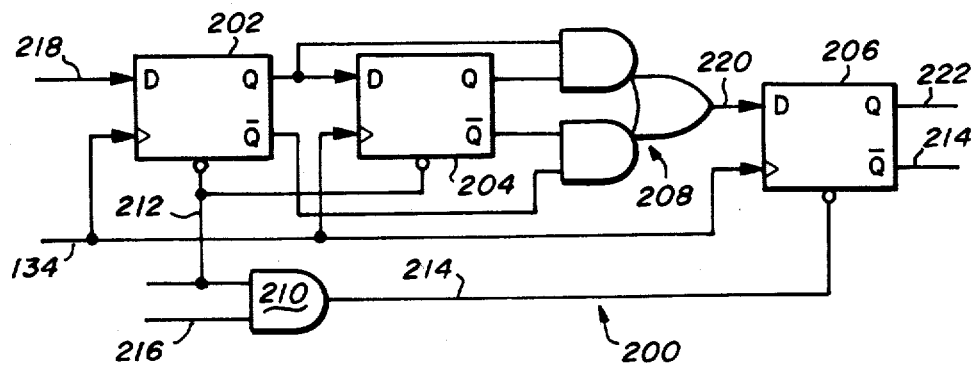
Fig._2A
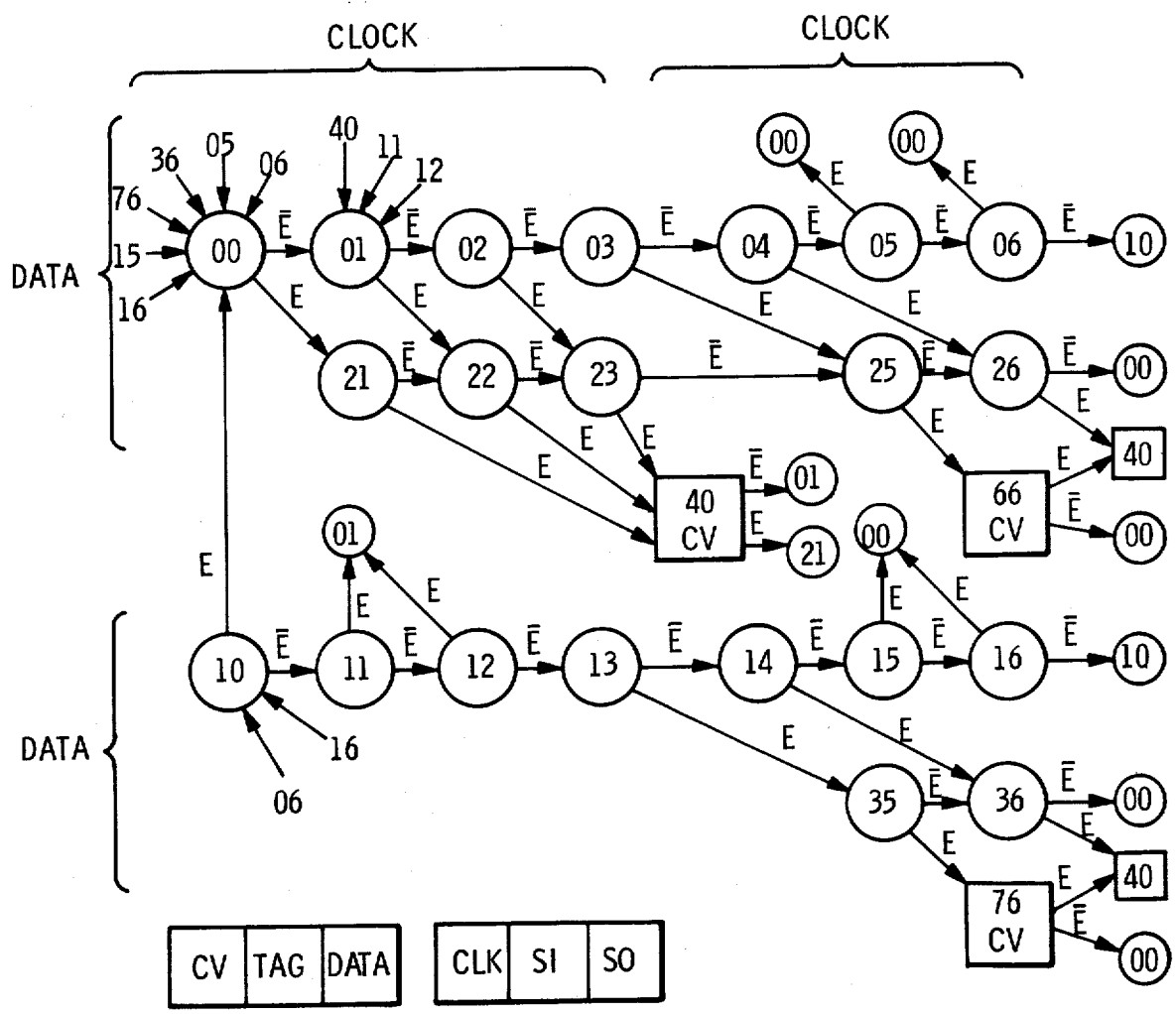
Fig._3

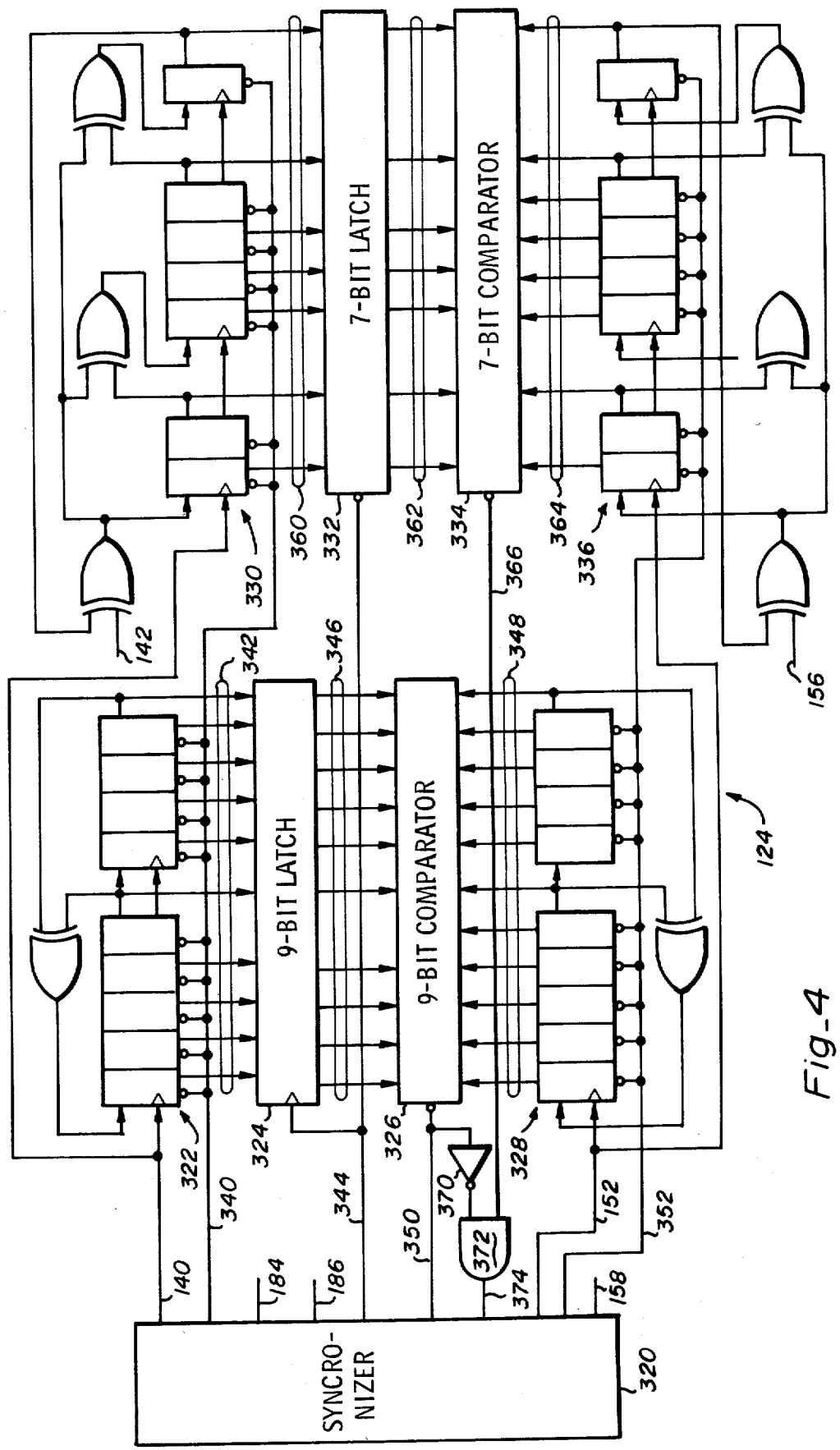
Fig_4

METHOD AND AN APPARATUS FOR EARLY BIT COLLISION DETECTION

BACKGROUND OF THE INVENTION

1. Field of the Invention

The present invention relates to computer networks generally and more specifically to a unit for interfacing an 82586-type local-communications controller to an RF-type modem.

2. Description of the Prior Art

Oftentimes, a personal computer is more useful when it is connected to a network to communicate with other computers. To facilitate such a connection, circuitry has been developed and integrated into a single device that is commonly referred to as a local-communications controller and that is designated 82586 by the Intel Corporation. The controller is ideally suited for use in a baseband network (such as an Ethernet network). Briefly, for transmission in such a network, the controller assembles information to be communicated, the data, into a packet of binary bits. Included in the packet is a series of bits which are collectively referred to as a preamble, a unique series of eight bits which are collectively referred to as an (opening) flag, a series of data bits, and bits forming another (closing) flag. Further, the controller encodes the bits of the packet in a non-return-to-zero (NRZ) format.

Before requesting transmission of the packet (as evidenced by a controller-generated active-low request-to-send ($\overline{RTS}$) signal), the controller waits until the network is idle (as evidenced by the inactive state of an active-low carrier-sense ($\overline{CRS}$) input-driving signal generated by circuitry external to the controller). Even though the controller waits until the network is idle, because of network and circuit delays, it is possible that the packet will collide with one transmitted substantially simultaneously by another computer. Upon detecting such a collision (as evidenced by an externally-generatd active-low collision-detect ($\overline{CDT}$) input-driving signal), the controller aborts transmission and waits a period of time before again attempting to transmit the packet. Finally, the controller decodes data from similarly encoded, received packets.

Unfortunately, the above-mentioned controller is less than ideally suited for use in broad-band RF-type network (such as, for example, a cable television (CATV) network). In such a network, packets are transmitted as FSK modulation of a first-frequency carrier (typically 50.75 Mhz); and, packets are received as FSK modulation of a second-frequency carrier (typically 219 Mhz). Conversion is accomplished by a head-end unit which receives each of the packets transmitted as modulation of the first-frequency carrier, converts the carrier frequency to the second frequency and retransmits the packet. In the RF-type network, packet transmission and reception is performed by a modem. A typical modem is responsive to the state of an (active-low transmit-key ($\overline{TX-KEY}$) input-driving) signal and operative to generate the first-frequency-carrier signal and to couple the signal onto the network (cable). Also, the modem is operative to FSK modulate the generated carrier signal responsive to a (transmit-data ($\overline{TXD}$) input-driving) signal (representing a packet-encoded for transmission). The modem is responsive to a second-frequency-carrier signal generated on the network (cable) and operative to generate an (active-low carrier-detect ($\overline{DCD}$)) signal the state of which indicates the presence of the carrier. Further, the modem is operative to generate a (receive-data (RXD)) signal representing the second-frequency-carrier FSK modulation (the received packet).

Unfortunately, packets transmitted on the RF-type network are encoded in a non-return-to-zero-inverted (NRZI) format; and, the above-mentioned modem does not perform the NRZ-to-NRZI and the NRZI-to-NRZ conversions necessary to interface the modem to the above-mentioned controller. Further, packets transmitted on the RF-type network may have multiple opening flags, a condition not permitted by the controller.

SUMMARY OF THE INVENTION

It is therefore an object of the present invention to provide a means for facilitating the connection of a personal computer to an RF-type network.

Another object of the present invention is to provide a means for interfacing an 82586-type controller to an RF-type network modem.

Another object of the present invention is to provide a means for converting packets encoded in NRZI format to NRZ format and for recovering the clocking information.

Still another object of the present invention is to provide a means for early detection of packet collisions in an RF-type network.

Briefly, an 82586-type local-communications-controller-to-RF-type-modem interfacing unit in accordance with the present invention employs a converter for converting from NRZ to NRZI format bits of a packet represented by a controller developed transmit-data signal to develop a signal suitable for driving the modem, a converter including an algorithmic-state machine for converting from NRZI to NRZ format bits of a packet received by the modem and represented by a receive-data signal and for developing an associated clocking signal suitable for driving the controller, and the combination of a pair of flag detectors and a flag filter for removing redundant opening flags from the converted, received packet to develop a signal suitable for driving the controller. Also employed is a switch for selectively coupling a controller-developed request-to-send signal to drive the transmit-key input of the modem and for selectively coupling a modem-developed carrier-detect signal for use in developing a carrier-sense signal for driving the controller or, alternatively, for selectively coupling back, the request-to-send signal for use in developing the carrier-sense signal. Finally, the unit employs a DCD extender for extending the length of the switch coupled signal to develop the carrier-sense signal, the combination, with one of the above-mentioned flag filters, of another flag filter and a comparator for comparing successive check-sum portions derived from bits of the transmit-data-signal packet with similar check-sum portions derived from bits of the format-converted receive-data-signal packet to detect a packet collision, a watch-dog counter for timing certain operations to detect a fault condition or a packet collision, and a collision detector for developing from NRZI-to-NRZ converter, comparator, and counter developed signals a collision-indicating signal suitable for driving the controller.

A material advantage of the present invention is the ability it affords to provide a means for interfacing an 82586-type controller to a RF-type-network modem.

Another advantage of the present invention is the ability it affords to provide a means for converting packets encoded in NRZI format to NRZ format and for recovering the clocking information. p Still another advantage of the present invention is the ability it affords to provide a means for early detection of packet collision in an RF-type network.

These and other objects and advantages of the present invention will no doubt become apparent to those skilled in the art after having read the following detailed description of the preferred embodiment illustrated in the several figures of the drawing.

IN THE DRAWING

FIG. 1 is a block diagram generally illustrating the elements of a unit for interfacing an 82586-type local-communications-controller to an RF-type modem;

FIGS. 2A-2B is a schematic diagram further illustrating the NRZI-to-NRZ converter shown in FIG. 1:

FIG. 3 is a diagram illustrating the various operative states of the NRZI-to-NRZ converter shown in FIG. 1; and FIG. 4 is a schematic diagram further illustrating the comparator shown in FIG. 1.

DETAILED DESCRIPTION OF THE PREFERRED EMBODIMENT

Figure 2B:
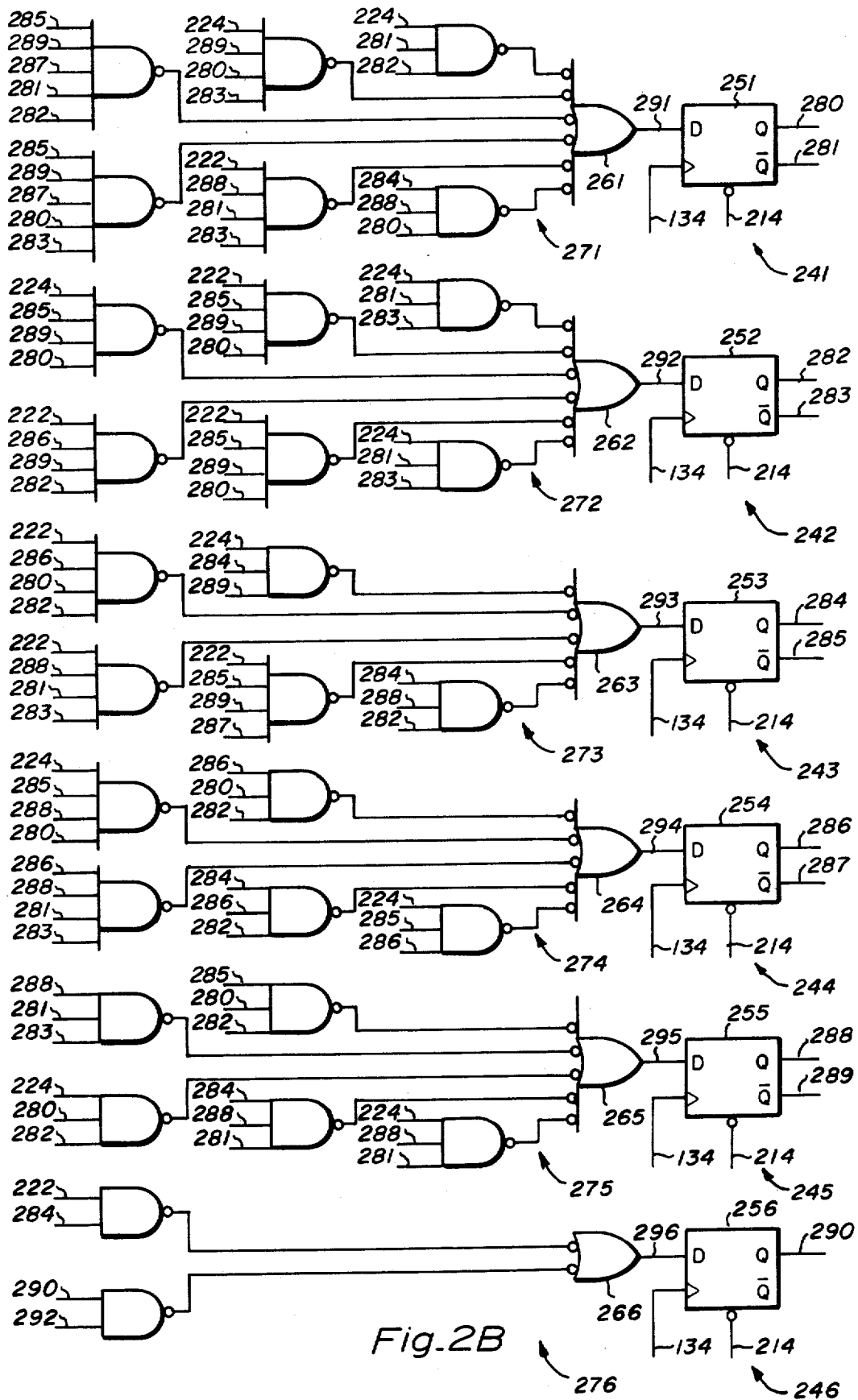

Illustrated in FIG. 1 of the drawing generally designated by the number 100 is a block diagram representing the presently preferred embodiment of a unit in accordance with the present invention for interfacing an 82586-type local-communications controller, designated 102, to an RF-type modem 104. Also illustrated is a local, central-processing unit (CPU) 106 which is connected to controller 102 in accordance with common practice, such as, for example, that documented in the Intel 82586 reference manual designated 210891-002.

Interface unit 100 is shown to employ as principal components an NRZ-to-NRZI converter 110, an NRZI-to-NRZ converter 112, a pair of flag detectors, designated 114 and 116, a flag filter 118, a DCD extender 120, another flag detector 122, a comparator 124, a watch-dog counter 126 and a collision detector 128. Additionally, unit 100 is shown to employ an inverter 130 for connection across an external, 14 Mhz, crystal, represented by a crystal 132, to generate on a line 134 a 14 Mhz, clocking signal and a Johnson-type counter 136 for dividing by 7 the 14 Mhz clocking signal to develop on a line 138 a 2 Mhz, transmit-clocking signal.

NRZ-to-NRZI converter 110 couples (buffered) the transmit-clocking signal developed on line 138 onto a line 140 to drive the (active-low) transmit-data-clock ($\overline{TXC}$) input of controller 102. Additionally, converter 110 is responsive to a transmit-data ($\overline{TXD}$) signal, which represents bits of a packet encoded for transmission in NRZ format and which is clocked onto a line 142 by controller 102 in synchronization with the line 140 clocking signal. Responsive thereto, converter 110 is operative to develop a signal on a line 144 which represents the packet bits converted to NRZ format suitable for driving the transmit-data (TXD) input of modem 104.

Preferably, for this purpose, converter 110 includes a D-type flip-flop clocked by the transmit-clocking signal developed on line 138 and gates connected to drive the flip-flop with either a signal developed from the NRZ, transmit-data signal developed on line 142 or one developed therefrom by an inverter, as selected by signals developed at the inverting and non-inverting outputs of the flip-flop, the latter signal being buffered to develop the line 144 NRZI transmit-data signal.

Details of NRZI-to-NRZ converter 112 are discussed in detail in conjunction with FIGS. 2A-2B. Briefly, converter 112 is responsive to a receive-data (RXD) signal which represents bits of a packet received by modem 104 encoded in NRZI format and which is developed on a line 148 by the modem. Responsive thereto, converter 112 is operative to develop a signal on a line 150 which represents the packet bits converted to NRZ format. Also, while converting the format of the packet bits, converter 112 is operative to develop on a line 152 an associated, receive-clocking signal suitable for driving the (active-low) receive-data-clock ($\overline{RXD}$) input of controller 102 to clock the received, converted, packet bits into the controller. Additionally, converter 112 is operative to develop on a line 154 a signal the state of which indicates whether an anomaly has occurred in the conversion process (one which indicates that the received packet has collided with another).

Flag detector 114, while coupling, delayed, the receive-data signal from line 150 to a line 156, monitors the bits of the packet the signal represents for the occurrence of a flag and develops a signal on a line 158 so delineating. Preferably, detector 114 includes an 8-bit shift register connected to couple, delayed, the bits of the packet represented by the receive-data signal from line 150 to line 156. Further, etector 114 includes an 8-input NAND gate for developing the line 158, flag-delineating signal. Each of the gate inputs is coupled to the output of a respective stage of the shift register, the first and last by an inverter and the others directly.

Flag detector 116, which is similar to detector 114, is connected to couple, delayed, the receive-data signal from line 156 to a line 162 and to develop a flag-delineating signal on a line 164.

Flag filter 118 is responsive to the flag-delineating signals developed on lines 158 and 164 and operative to remove redundant flags from the packet represented by the receive-data signal developed on line 162 to develop on a line 166 a signal suitable for driving the receive-data ($\overline{RXD}$) input of controller 102. In other words, until the signals developed on lines 158 and 164 delineate a flag in detector 116 and none in detector 114, filter 118 alters the receive-data-signal-packet bits, to all ones to remove redundant flags.

Interface unit 100 also employs a switch 170 a portion of which is connected to selectively couple the (active-low) request-to-send ($\overline{RTS}$) signal developed by controller 102 on a line 172 to a line 174 to (directly) drive the (active-low) transmit-key ($\overline{TX-KEY}$) input of modem 104. Alternatively, switch 170 couples the line 172 request-to-send signal to a line 176 for reasons a discussion of which are delayed until after the discussion of other FIG. 1 elements. Another portion of switch 170 is connected to selectively couple to a line 178 either the (activity-low) carrier-detect ($\overline{DCD}$) signal developed by modem 104 on a line 180 or, alternatively, the request-to-send signal developed on line 176.

To compensate for a delay of eight receive-clocking-signal cycles introduced by each of flag detectors 114 and 116, DCD extender 120 extends for 16 receive-clocking-signal cycles the carrier-detect (or request-to-send) signal developed on line 178 to develop on a line 182 a signal suitable for driving the (active-low) carrier-sense ($\overline{CRS}$) input of controller 102.

Flag detector 122, which is also similar to detector 114, is connected to monitor the bits of the packet represented by the transmit-data signal developed on line 142 by controller 102 for the occurrence of a flag and to develop a flag-delineating signal on a line 184.

While transmitting, comparator 124, which is discussed in detail in conjunction with FIG. 4, compares check sums derived from bits of successive portions of the transmit-data-signal packet against corresponding sums derived from bits of the next receive-data-signal packet (echo) to detect a packet collision. More specifically, from the occurrence of the opening flag of the transmit-data-signal packet, delineated by the signal developed on line 184 by flag detector 122, comparator 124 develops a running count of the cycles of the transmit-clocking signal (bits of the packet) and develops an error-detecting, running, cyclic-redundancy-check (CRC) sum of the bits of the packet represented by the transmit-data signal controller 102 develops on line 142. Upon the occurrence of the opening flag of the receive-data-signal packet, delineated by the signal developed on line 158 by flag detector 114, comparator 124 transfers to registers for storage the current transmit-clocking-signal-cycle count and the current transmit-data-signal-packet, CRC sum (while continuing the cycle count and CRC sum development). Also, from the occurrence of this receive-data-signal packet flag, comparator 124 develops a running count of the cycles of the receive-clocking signal (bits of the packet) and develops a running, CRC sum of the bits of the packet represented by the receive-data signal developed on line 150 by NRZI-to-NRZ converter 112.

When the current (running) receive-clocking-signal-cycle count equals the stored transmit-clocking-signal-cycle count, comparator 124 compares the current (running) receive-data-signal-packet, CRC sum with the stored transmit-data-signal-packet, CRC sum. Should the CRC sums not be the same, comparator 124 indicates that a packet collision has occurred by means of the state of a signal the comparator develops on a line 186. Next, comparator 124 transfers to the registers for storage the then current transmit-clocking-signal-cycle count and the current transmit-data-signal-packet, CRC sum and continues the testing until the occurrence of the closing flag of the transmit-data-signal packet, again delineated by the signal developed on line 184 by flag detector 122.

It is important to note that although CRC sum portions are compared, through the repetitive action, the result confidence) is the same as if full CRC sums for each, entire, packet had been developed and, then, compared. However, the above-described method provides a much earlier detection of a packet collision. (Checking the full packet is necessary to detect noise induced errors occurring after the period when packet collisions may occur.) (A full CRC sum comparison would not be possible until after the entire transmit-data-signal packet had been transmitted, a time too late to prevent an early abortion of the transmission.) Further, the above-described method permits the use of much simpler count and CRC sum developing circuits (fewer stages) than would be necessary to develop full counts and CRC sums.

Watch-dog counter 126 times certain operations to detect a fault condition or a packet collision. More specifically, counter 126 measures the period of time from the time at which transmission of a transmit-data-signal packet is begun, as delineated by the request-to-send signal developed by controller 102 on line 72, until the time at which modem 104 detects a carrier (echo) on the network (cable), as delineated by the carrier-detect signal developed on line 180 by the modem. Should this period exceed a maximum permissible period (for the size of the network), a fault has occurred (the network is down) and counter 126 so indicates by means of the state of a signal the counter develops on a line 188 to interrupt CPU 106. Additionally, counter 126 measures the period of time between the detection of the carrier and the occurrence of a receive-data-signal-packet-opening flag, as delineated by the signal developed on line 158 by flag detector 114. If a transmit-data-signal packet is being transmitted and should this second period exceed a predetermined maximum period, then the transmitted packet has collided with another; and, counter 126 so indicates by means of the state of a signal the counter develops on a line 190. Finally counter 126 measures the period of time during which modem 104 continuously detects a carrier. Should this third period exceed the period of a maximum length packet, a fault has occurred. Namely, the carrier generator of one of the modems of the network is stuck on; and, controller 126 so notifies CPU 106, again by means of the fault-indicating interrupt signal developed on line 188.

Preferably, for this purpose, counter 126 includes a 17-stage binary counter. Additionally, counter 126 includes gates connected to reset the binary counter when both the request-to-send (line 172) and carrier-detect (line 178) signals are inactive and, also, to reset the counter when the carrier-detect signal changes state. Gates are also included that are connected to couple to clock the binary counter the transmit-clocking signal when the request-to-send signal (line 172) is active (low) and to couple the receive-clocking signal when the carrier-detect signal (line 178) is active. Further, gates are included which are connected to develop the line 188, fault-indicating signal so as to interrupt CPU 106 if the count developed by the binary counter reaches the last (17th) stage or if the count reaches the 9th or 11th stage (preselected depending on the size of the network (cable length)), the request-to-send signal (line 172) is active (low) and the carrier-detect signal (line 178) is inactive (high). Finally, gates are included which are connected to develop the line 190, collision-indicating signal if the count reaches the 9th stage, the carrier-detect signal (line 178) is active, and the flag-delineating signal (line 158) indicates no receive-data-signal-opening flag has been detected.

Collision detector 128 (preferably) includes a three-input NOR gate connected to combine the collision-indicating signals developed on lines 154, 186 and 190 to develop a signal on a line 192 suitable for driving the (active-low) collision-detect ($\overline{CDT}$) input of controller 102.

Finally, interface unit 100 is shown to include control and status registers, designated 194, connected by a bus 196 to CPU 106 to permit the CPU to ascertain the status of and to control the state of interface unit 100 (primarily for testing but also for controlling the state of switch 170).

Although the condition in which a modem-carrier generator is stuck on is but one of many failure modes, it is a very important one. Such a failure not only renders a particular modem inoperative; but, it brings the whole network down (renders it inoperative). Thus, a method is provided by means of which the defective modem may be rapidly identified. Central to the method is an attempt to transmit a packet without driving the transmit-key input of the modem (104) with an active request-to-send signal (developed on line 174). It is important to note that without an active request-to-send signal, only the defective modem (if any) will transmit the packet.

More specifically, counter 126 of interface unit 100, and all similar interface units connected to modems which are connected to the network, identifies the condition by ascertaining that the carrier-detect signal developed on line 180 stays active longer than the time period required to transmit the longest permissible packet and so notifies CPU 106 by means of the state of the interrupt signal the counter develops on line 188. Responsive thereto, CPU 106 configures interface unit 100 such that switch 170 couples the request-to-send signal developed on line 172 by controller 102 to line 178 to drive DCD extender 120 and, thus, the carrier-sense input (connected to line 182) of controller 102. The request-to-send signal is not coupled to line 174 to drive the transmit-key input of modem 104 so that the modem, if not defective, will not transmit. Further, the carrier-detect signal, developed by modem 104 on line 180, is not coupled to line 178 to drive DCD extender 120 and, thus, controller 102 since the controller will not request the transmission of a packet when the signal is active. Finally, the request-to-send signal is coupled to line 178 to drive DCD extender 120 and, thus, controller 102 so that the controller will listen for a received packet.

Next, CPU 106 requests that controller 102 transmit a packet which uniquely identifies modem 104 from other modems which are connected to the network. Finally, should the defective modem transmit such a packet, all modems, including modem 104, will receive the packet. In this case, the packet will be received by modem 104, forwarded to interface unit 100 which converts the packet coding and forwards the packet to controller 102 and, thus, to the associated personal computer which displays an appropriate message.

NRZI-to-NRZ converter 112 has an edge detector which is shown in detail in FIG. 2A and an algorithmic-state machine which is shown in detail in FIG. 2B. With reference to FIG. 2A, the edge detector, which is generally designated 200, is shown to include three D-type flip-flops, designated 202, 204, and 206, an exclusive-OR gate 208, and an AND gate 210. All of the flip-flops, 202-206, are connected to be clocked by the 14 Mhz, clocking signal developed on line 134. Flip-flops 202 and 204 are connected to a line 212 to be reset by a signal developed external to interface unit 100; and, flip-flop 206 is connected by a line 214 to gate 210 to be reset either by the line 212 reset signal or one which is developed on a line 216 and which is the inverse (active-high) of the carrier-sense signal developed by DCD extender 120 on line 182 (both shown in FIG. 1). Flip-flop 202, which is driven by a signal that is developed on a line 218 from the line 148 (FIG. 1) NRZI, receive-data signal, is connected to synchronize (for timing considerations) the line 218 signal. Flip-flop 204 and gate 208 are connected to develop on a line 220 a signal the state of which indicates when a transition in the state (edge) of the line 218 receive-data signal occurred during the preceding cycle of the line 134, 14 Mhz, clocking signal. Finally, flip-flop 206 is connected to synchronize the line 220 signal to develop on a pair of lines 222 and 224 complementary receive-data-signal-transition-indicating signals, which are also referred to herein as edge or E signals.

Turning now to FIG. 2B, the algorithmic-state machine which is designated 230, and which is divided into six portions, designated 241-246, is shown to include (from top-to-bottom, right-to-left) six D-type flip-flops, designated 251-256, six (negative) OR gates, designated 261-266, and six groups of AND gates, designated as groups 271-276. Each of flip-flops 251-256 is connected to be clocked by the (14 Mhz) line 134 clocking signal and reset by the line 214 signal. Further, the flip-flops are connected, flip-flop 241 to develop complementary signals referred to herein as SI signals on a pair of lines 280 and 281, flip-flop 242 to develop complementary signals referred to herein as SO signals on a pair of lines 282 and 283, flip-flop 253 to develop complementary signals referred to herein as TAG or T signals on a pair of lines 284 and 285, flip-flop 254 to develop complementary signals referred to herein as data or D signals on a pair of lines 286 and 287, flip-flop 255 to develop complementary signals referred to herein as clocking, CLK or C signals on a pair of lines 288 and 289, and flip-flop 256 to develop a signal referred to herein as a code violation, CV or V signal on a line 290. Developed from the line 286 data signal, the line 288 clocking signal, and the line 290 code violation signal, are the line 150 receive-data signal, the line 152 receive-clocking signal, and the line 154 packet-collision-indicating signal, respectively.

The data input of each of flip-flops 251-256 is connected by a corresponding one of six lines, designated 291-296, to the output of a corresponding one of OR gates 261-266; and, the various inputs of each of OR gates 261-266 is connected each to a corresponding one of the AND gates of the respective AND gate groups 271-276. Finally, each of the AND inputs of AND gate groups 271-276 is connected to a predetermined one of the lines 222, 224, 280-290 and a line 298 (enabling signal), as shown in the diagram illustrated in FIG. 3 and in accordance with the following logical equations.

For portion 241, the next $S1 = E \cdot \overline{S1} \cdot SO + \overline{E} \cdot \overline{C} \cdot S1 \cdot \overline{SO} + T \cdot C \cdot SO + E \cdot C \cdot \overline{S1} \cdot \overline{SO} + \overline{T} \cdot \overline{C} \cdot D \cdot (\overline{S1} \cdot SO + S1 \cdot \overline{SO})$;

for portion 242, the next $SO = \overline{E} \cdot \overline{SO} \cdot \overline{S1} + \overline{E} \cdot \overline{SO} \cdot \overline{C} + E \cdot \overline{T} \cdot \overline{C} \cdot S1 + \overline{D} \cdot \overline{C} \cdot \overline{S1} \cdot \overline{SO} + \overline{E} \cdot T \cdot \overline{C} \cdot S1 + E \cdot D \cdot \overline{C} \cdot SO$;

for portion 243, the next $T(TAG) = T \cdot C \cdot SO + \overline{E} \cdot T \cdot \overline{C} + E \cdot \overline{T} \cdot \overline{C} \cdot \overline{D} + E \cdot D \cdot S1 \cdot SO + E \cdot C \cdot \overline{S1} \cdot \overline{SO}$;

for portion 244, the next $D(DATA) = \overline{E} \cdot T \cdot \overline{D} + \overline{E} \cdot T \cdot C \cdot S1 + D \cdot S1 \ SO + T \cdot D \cdot SO + D \cdot C \cdot \overline{C} \cdot \overline{S1} \cdot \overline{SO}$;

for portion 245, the next $C(CLK) = \overline{E} \cdot C \cdot \overline{S1} + \overline{T} \cdot S1 \cdot SO + T \cdot C \cdot \overline{S1} + C \cdot \overline{S1} \cdot \overline{SO} + \overline{E} \cdot S1 \cdot SO$; and, for portion 246, the next $CV = E \cdot T + (CV) \cdot$(the line 292 signal).

Illustrated in FIG. 3 are the various operative states of NRZI-to-NRZ converter 112 (shown in FIGS. 1 and 2A-2B). The various states are designated each by a 2-digit octal number. Each octal number represents the sum of numbers chosen from the group of numbers 1, 2, 4, 10, 20, and 40, each when a corresponding one of the signals SO, S1, C(CLK), D(DATA), T(TAG), and CV is active (true).

In an alternative embodiment, NRZI-to-NRZ converter 112 has six registers clocked by the (14 Mhz line 134) clocking signal and a read-only-memory device with seven addressing inputs six of which are connected each to the output of a corresponding one of the six registers and with six data outputs each connected to the data input of a corresponding one of the registers. The other addressing input is connected to receive the (line 224) transition (edge) indicating signal. The line 286, 288 and 290 signals are developed each at the output of a corresponding one of three of the registers.

Turning now to FIG. 4, comparator 124 is shown to include gates and flip-flops, represented by a block 320, for combining and synchronizing the timing of certain signals, a 9-bit linear-feedback shift register (modulo 511 counter) 322, a 9-bit latch (register) 324, a 9-bit comparator 326, another 9-bit linear-feedback shift register 328, a 7-bit cyclic-redundancy-check (CRC) sum generator 330, a 7-bit latch (register) 332, a 7-bit comparator 334 and another 7-bit cyclic-redundancy-check-sum generator 336. Register 322 is connected to be reset by a signal developed on a line 340 from the line 184 transmit-data-signal-flag-delineating signal and to be clocked by the line 140 transmit-clocking signal to develop on nine lines, collectively designated 342, signals representing a count of the cycles of the transmit-clocking signal (bits of the packet for transmission) from the opening flag.

Connected to latch the state of the signals developed on lines 342 at each of the times designated by a signal developed on a line 344, latch 324 develops on nine lines, collectively designated 346, signals having the latched states. Comparator 326 is connected to compare the count represented by the signals developed on lines 346 with a count represented by signals developed on nine lines, collectively designated 348, and to develop a signal on a line 350 the state of which represents the result (equal/not equal) of the comparison. Register 328, which is similar to register 322, is connected to be reset by a signal developed on a line 352 from a line 158 receive-data-signal-flag-delineating signal and to be clocked by the line 152 receive-clocking signal to develop on lines 348 signals representing the count of the cycles of the receive-clocking signal (bits of the received packet) from the opening flag.

Generator 330 is connected to be reset by the line 340 signal, clocked by the line 140 transmit-clocking signal and driven by the line 142 transmit-data signal to develop on seven lines, collectively designated 360, signals representing a 7-bit cyclic-redundancy-check sum of the packet for transmission from the open flag. Latch 332 is connected to develop on seven lines, collectively designated 362, signals having the same state as those developed on lines 360 at each of the times designated by the signal developed on line 344. Comparator 334 is connected to compare the sum represented by the signals developed on lines 362 with a sum represented by signals developed on seven lines, collectively designated 364, and to develop on a line 366 a signal the state of which represents the comparison result. Similar to generator 330, generator 336 is connected to be reset by the line 352 signal, clocked by the line 152 receive-clocking signal, and driven by the line 156 receive-data signal to develop the lines 364 signals so as to represent a 7-bit cyclic-redundancy-check sum of the received packet from the opening flag.

Additionally, comparator 124 includes an inverter 370 and a 2-input AND gate 372 connected to develop a signal on a line 374 the state of which indicates when the signal developed on line 366 by comparator 334 indicates that the sum represented by the signals developed on lines 362 is not the same as the sum represented by the signals developed on lines 364 at the time that the signal comparator 326 developed on line 350 indicates that the count represented by the signals developed on lines 346 is the same as the count represented by the signals developed on lines 348. From the line 374 signal, synchronizer 320 develops the line 186, packet-collision-indicating signal. Also, synchronizer 320 combines the line 1840 and line 3500 signals to develop the line 344 signal to designate as latching times the time at which the receive-data-signal opening-flag occurs and each of the times at which the lines 346 latched (packet for transmission bit) count is the same as the lines 348 (received packet bit) count.

In the presently preferred embodiment, the elements of interface unit 100 are integrated in a device of the type that is commonly referred to as a gate array.

Although with the presently preferred embodiment of the present invention an 82586-type controller and a specific modem are employed, obviously other controllers (or even serial devices) and other modems may be employed.

After having read the preceding disclosure, certain alterations and modifications of the present invention will no doubt be apparent to those skilled in the art. It is therefore intended that the following claims cover all such alterations and modifications as fall within the true spirit and scope of the invention.

What is claimed is:

1. A method of serially transmitting bits in a network and receiving echo bits from the network to provide early detection of bit collision, the method comprising in combination the steps of:
   serially transmitting the bits;
   developing a running count of said bits as they are being transmitted beginning at least from a first predetermined one of said bits;
   developing a running check sum of said bits as they are being transmitted beginning at least from a second predetermined one of said bits;
   serially receiving said bits;
   developing a running count of said bits as they are being received at least from said first predetermined bit;
   developing a running check sum of said bits as they are being received at least from said second predetermined bit;
   at a time at least when a third predetermined one of said bits is being received, storing the current transmitted-bit count;
   at said third predetermined bit time, storing the current transmitted-bit-check sum;
   comparing the current received-bit count to the stored-bit count; and
   when the current received-bit count equals said stored-bit count, comparing the current received-bit-check sum to the stored-bit-check sum to detect a bit collision.

2. A method as recited in claim 1 further comprising repeating said storing and comparing steps.

3. A comparator for comparing bits which are represented by a transmit-data signal, which are clocked by a transmit-clocking signal, and which are for transmission in a network with echo bits which are represented by a receive-data signal, which are clocked by a receive-clocking signal, and which are received from the network to provide a signal indicating detection of bit collision, the comparator comprising in combination:
   first flag detecting means connected to receive the transmit-data signal, said first flag detecting means for developing a signal delineating a predetermined bit combination;

first counter means connected to said first flag detecting means to be reset by said first-flag-detecting-means-developed signal and to receive the transmit-clocking signal, said first counter means for developing signals representing the count of the bits of said transmit-data signal;

second flag detecting means connected to receive the receive-data signal, said second flag detecting means for developing a signal delineating said predetermined bit combination;

coupling means;

first register means connected to said first counter means and by said coupling means to said second flag detecting means, said first register means for storing the states of said first counter means developed signals at the time delineated by said second-flag-detecting-means-developed signal and for developing signals representing the stored states;

second counter means connected to said second flag detecting means to be reset by said second-flag-detecting-means-developed signal and connected to receive the receive-clocking signal, said second counter means for developing signals representing the count of the bits of said receive-data signal;

first comparator means connected to said first register means and to said second counter means, said first comparator means for comparing the count represented by said first-register-means-developed signals with the count represented by said second-counter-means developed signals and for developing a signal indicating when the counts are equal;

first check sum generating means connected to said first flag detecting means to be reset by said first-flag-detecting-means-developed signal, to receive said transmit-clocking signal to be clocked thereby, and to receive said transmit-data signal, said first check sum generating means for developing signals representing a check sum of the bits of said transmit-data signal;

second register means connected to said first check sum generating means and by said coupling means to said second flag detecting means, said second register means for storing the states of said first-check-sum-generating-means-developed signals at said time delineated by said second-flag-detecting-means-developed signal and for developing signals representing the stored states;

second check sum generating means connected to said second flag detector means to be reset by said second-flag-detecting-means-developed signal, to receive said receive-clocking signal to be clocked thereby, and to receive said receive-data signal, said second check sum generating means for developing signals representing a check sum of the bits of said received-data signal;

second comparator means connected to said second register means and to said second check sum generating means, said second comparator means for comparing the check sum represented by said second-register-means-developed signals with the check sum represented by said second-check-sum-generating-means-developed signals and for developing a signal indicating when the check sums are equal; and gate means connected to said first and said second comparator means, said gate means for developing the bit-collision-indicating signal to indicate a bit collision when said first-comparator-means-developed signal indicates that the counts are equal if the second-comparator-means-developed signal indicates that at the time the check sums are not equal.

4. A comparator as recited in claim 3 wherein said coupling means is connected to said first comparator means and wherein said coupling means includes means for resetting said first and said second registers when said first-comparator-means-developed signals indicate that the counts are equal.

5. A method of identifying a defective one of a plurality of modems each of which is connected to a network and each of which is interfaced to a corresponding local-comunications, controller by a corresponding unit which couples a controller-developed request-to-send signal to drive a modem transmit-key input and couples a modem-developed carrier-detect signal to drive a carrier-sense input of the controller, the method comprising in combination the steps of:

identifying a fault condition by ascertaining that the carrier-detect signal developed by at least one of said modems stays active longer than a predetermned time period;

switching the coupling of the interface unit corresponding to said one of said modems by disconnecting the request-to-send-signal-to-modem coupling, disconnecting the carrier-select-signal-to-controller coupling, and connecting to couple the request-to-send signal to drive the controller carrier-sense input;

attempting to transmit a modem-identifying packet at said one of said modems; and receiving the modem-identifying packet thereby identifying the defective modem.

* * * * *